US011210087B2

(12) United States Patent
Abadi et al.

(10) Patent No.: US 11,210,087 B2
(45) Date of Patent: Dec. 28, 2021

(54) SYSTEM AND METHOD FOR INTERPROCEDURAL ANALYSIS

(71) Applicant: WHITESOURCE LTD., Givatayim (IL)

(72) Inventors: Aharon Abadi, Givatayim (IL); Bar Makovitzki, Givatayim (IL); Ron Shemer, Givatayim (IL); Eugen Horovitz, Givatayim (IL)

(73) Assignee: WHITESOURCE LTD., Givatayim (IL)

( * ) Notice: Subject to any disclaimer, the term of this patent is extended or adjusted under 35 U.S.C. 154(b) by 50 days.

(21) Appl. No.: 16/702,834

(22) Filed: Dec. 4, 2019

(65) Prior Publication Data

US 2021/0173639 A1 Jun. 10, 2021

(51) Int. Cl.
*G06F 9/44* (2018.01)
*G06F 8/75* (2018.01)
*G06F 16/901* (2019.01)

(52) U.S. Cl.
CPC ............ *G06F 8/75* (2013.01); *G06F 16/9024* (2019.01)

(58) Field of Classification Search
CPC ............................... G06F 8/75; G06F 16/9024
USPC ......................................................... 717/104
See application file for complete search history.

(56) References Cited

U.S. PATENT DOCUMENTS 9,501,383 B2 * 11/2016 Bolignano .......... G06F 11/3608

* cited by examiner

*Primary Examiner* — Chuck O Kendall
(74) *Attorney, Agent, or Firm* — The Roy Gross Law Firm, LLC; Roy Gross

(57) ABSTRACT

A computer-implemented method, system and computer program product, the method comprising: obtaining computer code; abstracting the computer code to obtain abstracted computer code comprising a plurality of instructions; generating a constraint system, comprising one or more constraints on one or more entities of the abstracted computer code; obtaining a solution to the constraint system, the solution comprising one or more possible types for each entity; and creating a call graph based on the types of the entities.

22 Claims, 4 Drawing Sheets

SYSTEM AND METHOD FOR INTERPROCEDURAL ANALYSIS

TECHNICAL FIELD

The present disclosure relates to analyzing source code in general, and to a system and method for generating an extended call graph, in particular.

BACKGROUND OF THE INVENTION

Interprocedural analysis refers to gathering information about an entire program rather than only a single procedure as done in intraprocedural analysis. Interprocedural analysis enables a more precise analysis information and may be used for applications such as optimizing compilers, detecting compile-time errors, detecting dead-code, determining program coverage, or the like.

A call graph is a graph representing control flow within a computer program, by indicating calling relationships between subroutines, methods, functions or other entities in a computer program. Each node in the graph represents an entity, such as a file, an object, a procedure, a function, a method, or the like and each edge going from node A o node B indicates that entity A calls entity B.

Call graphs can be dynamic or static. A dynamic call graph is a record of a particular execution of the program, for example as output by a profiler. Thus, a dynamic call graph only describes one run of the program. A static call graph is a call graph intended to represent all calls that may occur in any possible run of the program. Thus, a static call graph may also include calls that never occur, for example due to a condition that never holds, such as an option never selected by a user.

Call graphs can be defined to represent varying degrees of precision. A more precise call graph approximates more closely the behavior of the real program, at the cost of taking longer to compute and more memory to store. A sound call graph may be defined as a call graph that comprises an edge for each call that can take place in any run of the program.

Programs written in dynamically typed languages, such as Python, present additional challenges to creating static call graphs. A name-based call graph that uses method names alone as node identifiers is insufficient, since the dynamic polymorphism enables different methods having the same name.

SUMMARY OF THE INVENTION

One exemplary embodiment of the disclosed subject matter is a computer-implemented method comprising: obtaining computer code; abstracting the computer code to obtain abstracted computer code comprising a plurality of instructions; generating a constraint system, comprising one or more constraints on one or more entities of the abstracted computer code; obtaining a solution to the constraint system, the solution comprising one or more possible types for each entity; and creating a call graph based on the types of the entities. Within the method, the constraint system is optionally generated upon one or more instructions from the plurality of instructions, each of the at least one instruction selected from the group consisting of: an assignment and a method invocation. Within the method, said abstracting optionally comprising eliminating from the computer code one or more flow-related instructions. Within the method, said abstracting the computer code optionally comprises entering one or more second instructions replacing the flow-related instructions. Within the method, one or more flow-related instructions are optionally selected in accordance with a programming language of the computer code. Within the method, obtaining the solution optionally comprises using a technique selected from the group consisting of: abstract interpretation and chaotic iteration. Within the method, each entity is optionally a variable or a parameter. Within the method, each possible type of each entity optionally comprises two or more possible types for the entity. Within the method, said generating the constraint system and said obtaining the solution to the constraint system are optionally repeated until no changes are detected.

Another exemplary embodiment of the disclosed subject matter is a computerized apparatus having a processor, the processor being adapted to perform the steps of: obtaining computer code; abstracting the computer code to obtain abstracted computer code comprising a plurality of instructions; generating a constraint system, comprising one or more constraints on one or more entities of the abstracted computer code; obtaining a solution to the constraint system, the solution comprising one or more possible types for each entity; and creating a call graph based on the types of the entities. Within the apparatus, the constraint system is optionally generated upon one or more instructions from the plurality of instructions, each of the at least one instruction selected from the group consisting of: an assignment and a method invocation. Within the apparatus, said abstracting optionally comprising eliminating from the computer code one or more flow-related instructions. Within the apparatus, said abstracting the computer code optionally comprises entering one or more second instructions replacing the flow-related instructions. Within the apparatus, one or more flow-related instructions are optionally selected in accordance with a programming language of the computer code. Within the apparatus, obtaining the solution optionally comprises using a technique selected from the group consisting of: abstract interpretation and chaotic iteration. Within the apparatus, each entity is optionally a variable or a parameter. Within the apparatus, each possible type of each entity optionally comprises two or more possible types for the entity. Within the apparatus, said generating the constraint system and said obtaining the solution to the constraint system are optionally repeated until no changes are detected.

Yet another exemplary embodiment of the disclosed subject matter is a computer program product comprising a computer readable storage medium retaining program instructions, which program instructions when read by a processor, cause the processor to perform a method comprising: obtaining computer code; abstracting the computer code to obtain abstracted computer code comprising a plurality of instructions; generating a constraint system, comprising one or more constraints on one or more entities of the abstracted computer code; obtaining a solution to the constraint system, the solution comprising one or more possible types for each entity; and creating a call graph based on the types of the entities.

BRIEF DESCRIPTION OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION OF THE INVENTION

Figure 1:
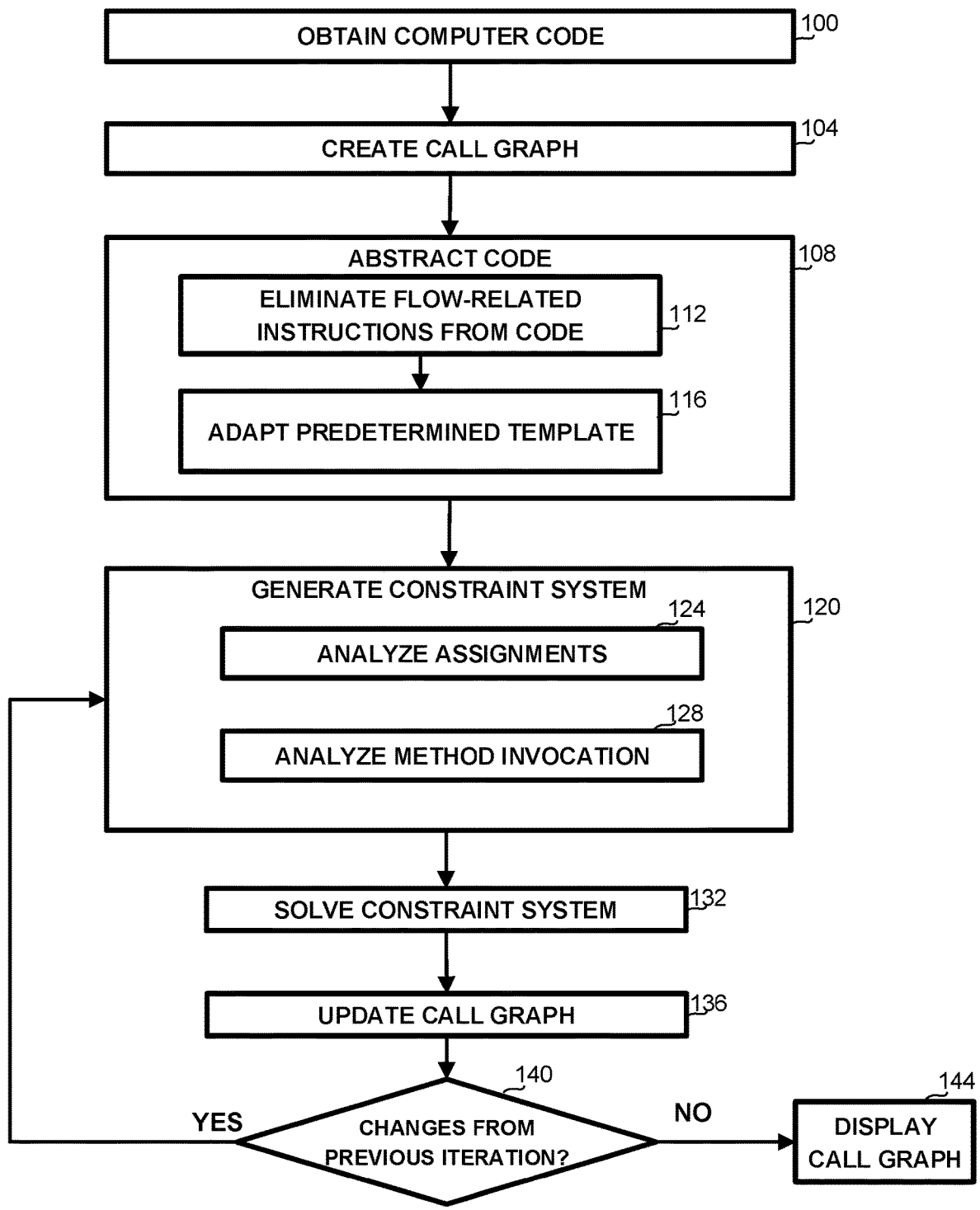
FIG. 1 is a flowchart of steps in a method generating a call graph, in accordance with some exemplary embodiments of the subject matter.

A call graph is a representation of the invocation relationship between methods, functions or other executable units within computer code. In some embodiments, each node represents such unit, and an edge from node A to node B represents that the unit represented by node A invokes node B. A graph may have a graphical representation.

One technical problem dealt with by the disclosed subject matter is the need to generate a call graph from computer code, in order to get insights into the code. A call graph may be used for a variety of purposes, such as but not limited to compiler optimization, compile-time error detection, dead code detection, program coverage determination, or the like.

Another technical problem dealt with by the disclosed subject matter is the need to generate a static call graph. A static call graph represents all possible invocation relationship, rather than the actual invocations that took place in one or more executions of the code as offered by a dynamic call graph. A static call graph can be generated before the computer code is compiled or executed, or when is known to contain bugs, and can thus be used in all stages of the code development.

Yet another technical problem dealt with by the disclosed subject matter is the need to generate a call graph for any programming language, including static as well as dynamic typed languages, such that whether a variable type may be checked at compile time or at run time.

Yet another technical problem dealt with by the disclosed subject matter is the need for the call graph to be sound, i.e., contain an edge for each possible invocation. Thus, the call graph needs to be a superset of all possible dynamic call graphs.

One technical solution comprises obtaining computer code. The computer code may then be abstracted, by eliminating from the computer code the flow-related instructions, such as but not limited to "for" loops, "while" statements, "with" statements, "if-then" constructs, "if-then-else" constructs or the like. It will be appreciated that only the control-related parts are eliminated, while other instructions which may generate side effects, even embedded therein, may be left. For example, an assignment within a control statement may be left intact, as well as the instructions within the body of the statement. In some embodiments and depending on the code, the eliminated constructs may be replaced by default instructions, including for example variable definitions, constructors or the like.

The abstracted code may then be used for generating a constraint system comprising constraints on the possible types of values for each variable, parameter or another entity.

The constraint system may then be solved, such that one or more possible types are associated with each variable or method parameter. Solving may be performed, for example, by propagation, which may extend the group of possible types for additional variables or parameters.

Once the possible types are constant and do not change by additional iterations of the constraint system generation and solving, a call graph may be generated.

Referring now to FIG. 1, showing a flowchart of steps in a method for generating a call graph, in accordance with some embodiments of the disclosure.

On step 100, computer code may be obtained. The code may be obtained in any manner, such as read from a file, transmitted over a communication network, typed by a programmer, for example a part of using an Integrated Development Environment (IDE), or the like. The code may be in any programming language, such as but not limited to Python, Java, C, C++, or the like. For example, the code listed in Code Listing 1 may be received:

| | Code Listing 1 |
|---|---|
| 1 | class A: |
| 2 | def f(self): |
| 3 | pass |
| 4 | class B: |
| 5 | def f(self): |
| 6 | pass |
| 7 | def g(p): |
| 8 | p.f( ) |
| 9 | a = A( ) |
| 10 | if __name__ == '__main__': |
| 11 | b = B( ) |
| 12 | g(a) |

On step 104, a call graph may be created. The call graph may initially comprise a node for each file, method, function, procedure or another executable unit within the computer code, and no edges.

Figure 2A:
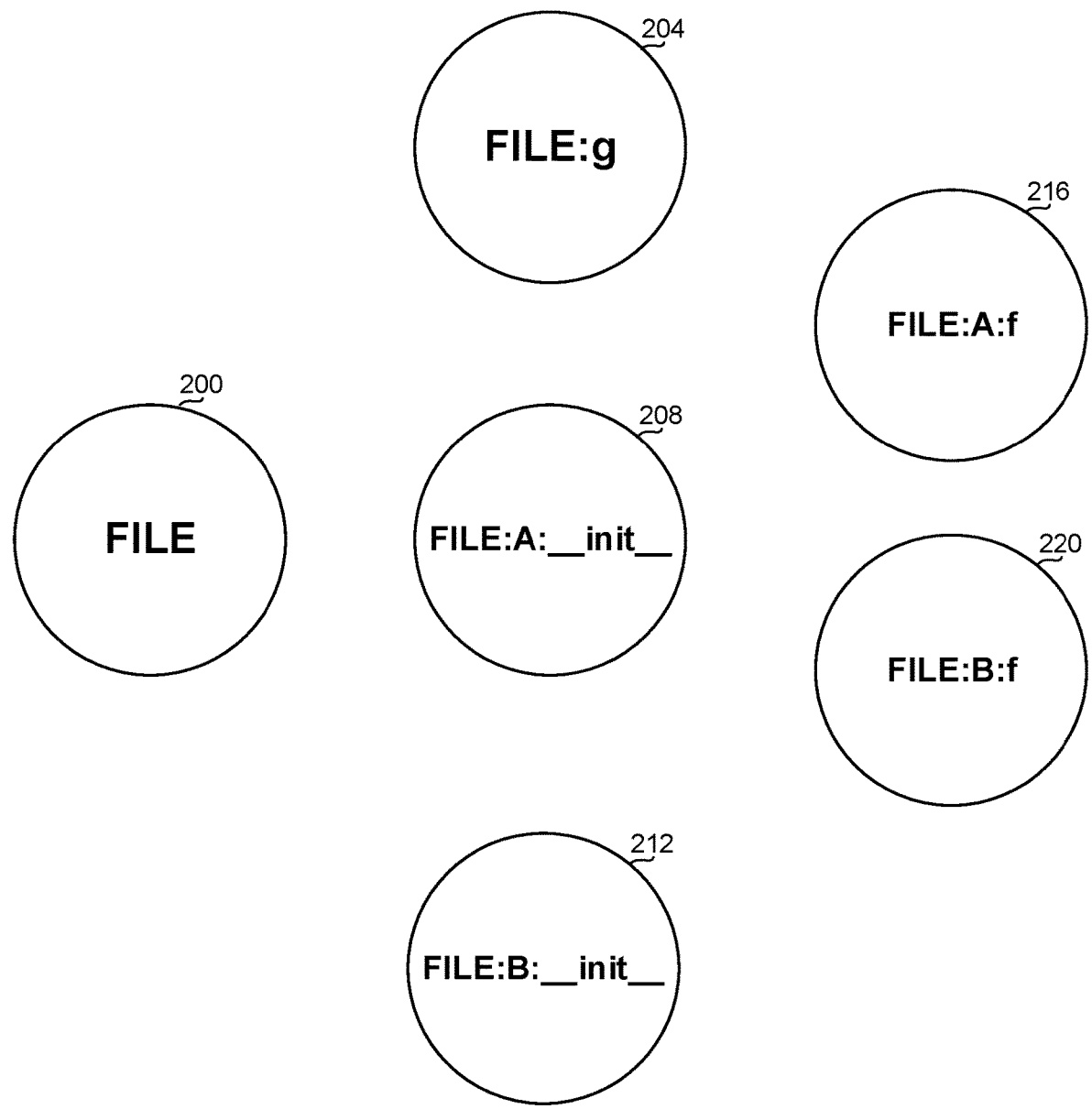
FIG. 2A shows an initial call graph comprising a node for each function or method, in accordance with some exemplary embodiments of the subject matter.

Referring now also to FIG. 2A, showing the initial graph, comprising a node for each function or method of Code Listing 1. As also shown in FIG. 2A, the graph may also comprise a node for the file, which may be a type in Python. The graph thus comprises node 200 for the file, node 204 for function g which is in the context of the file, nodes File:A:_init_ 208 and File:B:_init_ 212 which are in the context of A and B, respectively, and functions File:A:f 216 and File:B:f 220, which are also in the context of A and B, respectively.

It will be appreciated that in alternative embodiments the call graph may be generated at any later stage, before the first time it is being updated, as detailed below.

On step 108, the code may be abstracted. Abstracting the code may include step 112 of eliminating from the code the flow-related instructions, like "for", "while", or "repeat" loops, "with" statements" "If-then" or "if-then-else" constructs, or others.

On step 116, predetermined template instructions may be adapted to the code and entered where required, due to the removal of the flow-related instructions.

It will be appreciated that steps 112 and 116 can be executed simultaneously or consecutively for one instruction, before moving on to the next instruction, the "pass" instruction is replaced by an empty instruction, "def" is replaced by "function", and the control-related part of an "if" statement is eliminated, thus obtaining Code listing 2.

Code Listing 2

| | |
|---|---|
| 1 | class A: |
| 2 | def f(self): |
| 3 | empty |
| 4 | class B: |
| 5 | def f(self): |
| 6 | empty |
| 7 | function g(p): |
| 8 | p.f( ) |
| 9 | a = A( ) |
| 10 | b = B( ) |
| 11 | g(a) |

The instruction elimination or replacement may be performed in accordance with templates associated with each construct in each handled programming language. The templates may be adapted for the code, for example a unique variable name may be generated and used. For example, a "for statement" in Code Listing 3 below can be replaced with the statements shown in Code Listing 4 below:

Code Listing 3

| | |
|---|---|
| 1 | for i in range(10) |
| 2 | a.f(i) |

Code Listing 4

| | |
|---|---|
| 1 | temp = range(10) |
| 2 | i = itemOf(temp) |
| 3 | a.f(i) | itemOf is an exemplary proprietary construct which puts a constraint on the type of its variable. In this case, temp is an array, thus the itemOf instruction sets a constraint that i is of the types of the members of temp.

In another example, when eliminating a "with" statement, the "__enter__" and "__exit__" functions need to be called explicitly, as shown in Code Listing 5 below transformed into Code Listing 6 below.

Code Listing 5

| | |
|---|---|
| 1 | with A( ) as a: |
| 2 | a.f( ) |

Code Listing 6

| | |
|---|---|
| 1 | temp = A( ) |
| 2 | a = temp.__enter__( ) |
| 3 | a.f( ) |
| 4 | temp.__exit__( ) |

On step 120, a constraint system may be generated by analyzing and inferring the types for one or more entities, including the variables and parameter within the program. The constraint system is generated upon one or more instructions, each instruction being an assignment or a method invocation. Inferring the types may include associating with each variable and parameter with a group comprising all possible types for the variable or parameter.

The details below use as an example Code Listing 7 below:

Code Listing 7

| | |
|---|---|
| 1 | a = A( ) |
| 2 | b = B( ) |

-continued

Code Listing 7

| | |
|---|---|
| 3 | g(a) |
| 4 | class A: |
| 5 | def __init__(self) |
| 6 | empty |
| 7 | def f(self): |
| 8 | empty |
| 9 | class B: |
| 10 | def __init__(self) |
| 11 | empty |
| 12 | def f(self): |
| 13 | empty |
| 14 | function g(p): |
| 15 | p.f( ) |

Table 1 below shows the types associated with each such variable or parameter. The leftmost column indicates the scope of the variable or parameter, and the center column indicates its name, together providing injective identification of the variable or parameter. The right-hand column provides the group of types associated with the variable or parameter.

On step 124, assignment instructions may be analyzed, such that the types associated with a variable or parameter may be extended by an assignment. Thus, the assignment in lines 1 and 2 of a=A( ) and b=B( ) associates, respectively the types of A and B with the variables a and b in the context of the file, as shown in rows 1 and 2 of Table 1.

On step 128, the method invocation instructions are analyzed and the type of its parameter are inferred to the types of the actual parameters. Thus, since a is associated with the group types consisting of {A}, and since the __init__ function of A is called for constructing a, the self formal parameter of the __init__ function of A is associated with the group {A}, and similarly for b, as shown in rows 3 and 4 of Table 1.

Since the function g is called with the actual parameter a for its formal parameter p, then the formal parameter p of g is also associated with the group {A} as shown in row 4 of Table 1.

Function g calls the function $f$ for its parameter p. Therefore, if the formal parameter p of g can receive type A, the function $f$ that will be called is $f$ of A with its self parameter being of the element of group type {A}, being A. Since g is not being called with self being of type {B}, the function $f$ of B will not be called, as shown in rows 6 and 7 of Table 1.

TABLE 1

| | Scope | Name | Type |
|---|---|---|---|
| 1 | File | a | {A} |
| 2 | File | b | {B} |
| 3 | File:A:__init__ | self | {A} |
| 4 | File:B:__init__ | self | {B} |
| 5 | File:g | p | {A} |
| 6 | File:A:f | self | {A} |
| 7 | File:B:f | self | { } |

On step 132, the generated constraint system may be solved. Solving the constraint system may be performed in any known technique for a non-limiting example propagation, and in particular abstract interpretation or chaotic iteration.

On step 136 the call graph may be updated, in accordance with the solutions to the constraints which have been changed. It will be appreciated that on any iteration the possible variable types define the accessible functions or methods, upon which the graph is constructed or updated.

Figure 2B:
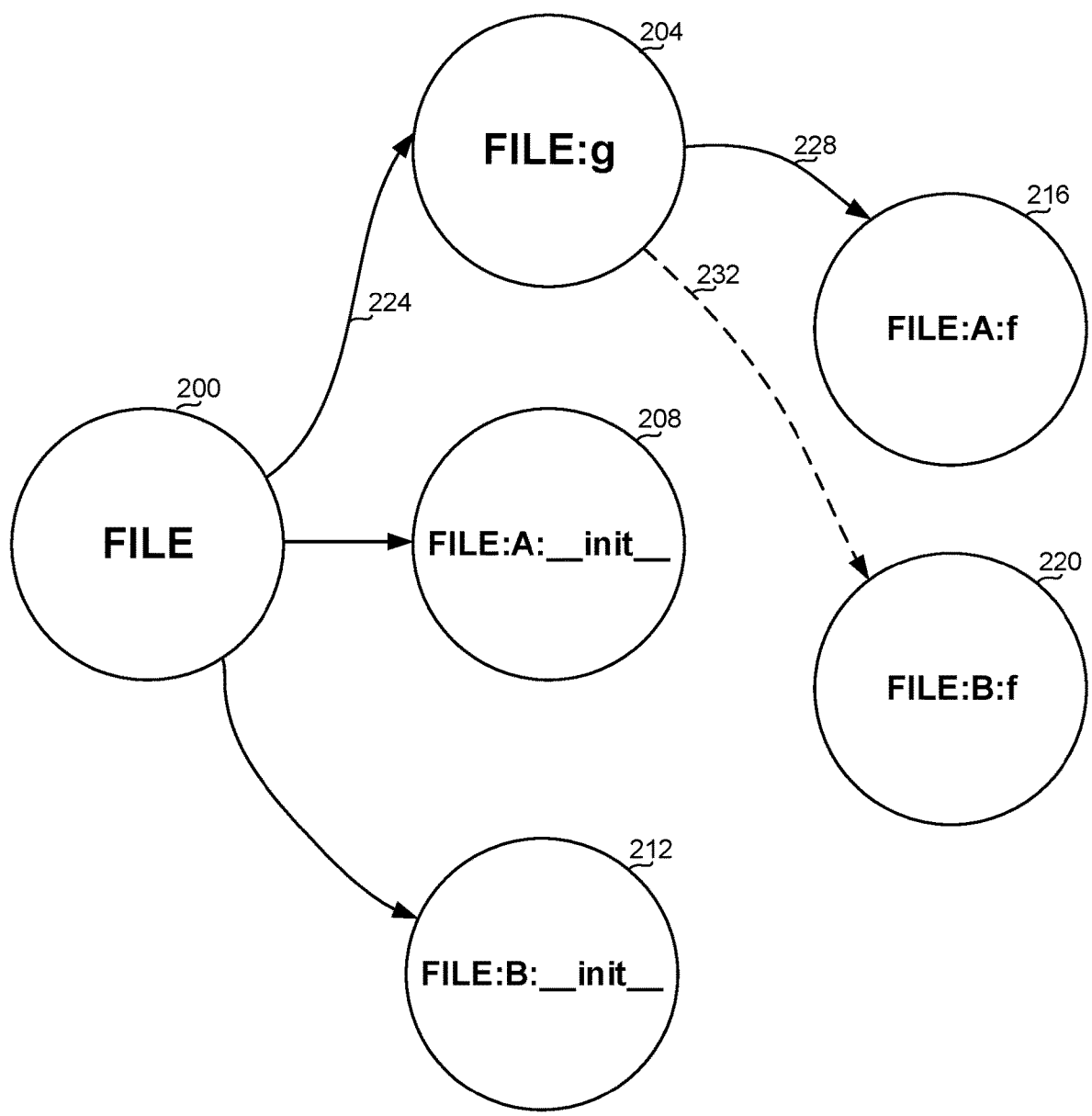
FIG. 2B shows an actual call graph built upon code, in accordance with some exemplary embodiments of the subject matter.

Referring now also to FIG. 2B, showing the graph built through the iterations of Code Listing 2. Upon each method or function invocation, an edge may be added (unless the edge existed before) to the graph. For example, upon the invocation of function g, edge 224 connecting File node 200 with File:g node 204 may be added. Upon associating the p formal parameter of g with {A}, edge 228 connecting File:g node 204 with File:A:ƒ node 216 may be added.

It will be appreciated that if Code Listing 7 would have contained also a line g(b), then g would also be called with the actual parameter b for its formal parameter p, such that the formal parameter p of g may also be associated with B, and thus with the group {A,B}. This will also imply that if the formal parameter p of g can receive type B, the function ƒ that will be called is ƒ of B, with its self parameter being of type B. In such case, rows 5 and 7 of Table 1 would have changed as shown in Table 2 below, and edge 232 connecting File:g node 204 with File:B.ƒ node 220 may be added to the graph of FIG. 2B.

TABLE 2

| 5 | File:g | p | {A, B} |
| 7 | File:B:f | self | {B} |

Referring now back to FIG. 1, on step 140 it may be determined whether a change has occurred in any of the group types associated with any variable or parameter before and after the last iteration.

If a change has occurred, execution may return to step 120 for an additional iteration.

If no change has been detected, then on step 144 the analysis and graph generation may be finished. If required, on step 144 the graph may be displayed to a user in a table form or in a visual form similar to the example of FIG. 2B above, stored in a file, or the like.

It will be appreciated that the graph may also be updated altogether after all type inference is done, and all type groups have been associated with the variables and parameters. The graph may also be created at any stage prior to this single update.

Since the collection of types within the computer code is finite, and since types may only be added to the group associated with each variable or parameter, the process is guaranteed to stabilize such that further iterations do not make any change.

It will be appreciated that the graph may or may not be displayed in a graphic manner. A graph may be represented by a data structure indicating the nodes and edges, and the graphic representation is merely another representation which may be helpful for visual purposes.

Figure 3:
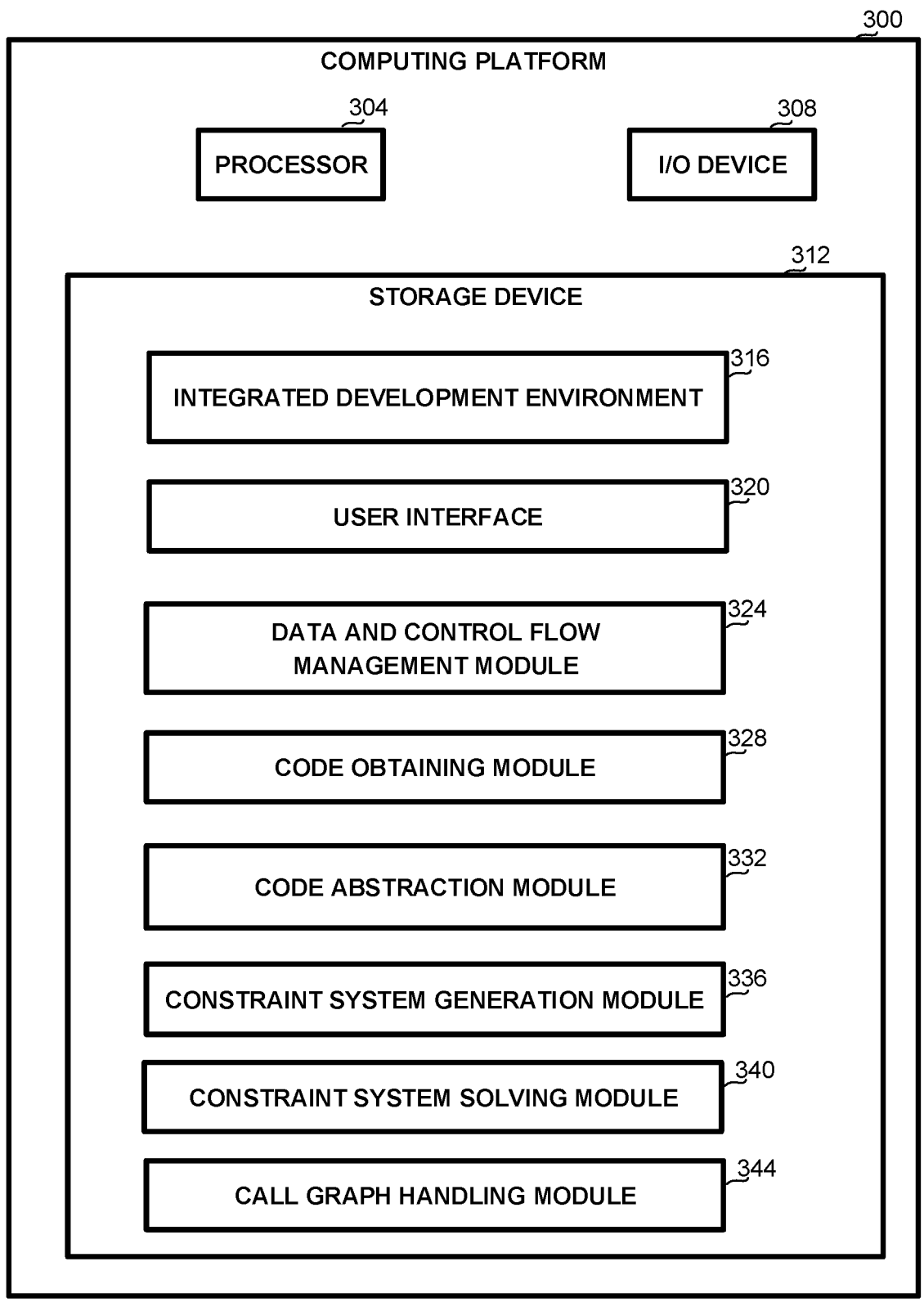
FIG. 3 shows a block diagram of a system for generating a call graph, in accordance with some exemplary embodiments of the subject matter.

Referring now to FIG. 3 showing a block diagram of a system generating a call graph, in accordance with some exemplary embodiments of the subject matter.

The system may comprise one or more computing platform 300, which may be for example a computing platform used by a developer. The system may be implemented as a stand-alone system, or as part of an Integrated Development Environment (IDE) implemented for example as a plug-in, as a web service, or the like.

In some exemplary embodiments of the disclosed subject matter, computing platform 300 can comprise processor 304. Processor 304 may be any one or more processors such as a Central Processing Unit (CPU), a microprocessor, an electronic circuit, an Integrated Circuit (IC) or the like. Processor 304 may be utilized to perform computations required by the apparatus or any of it subcomponents.

In some exemplary embodiments of the disclosed subject matter, computing platform 300 can comprise an Input/Output (I/O) device 308 such as a display, a pointing device, a keyboard, a touch screen, or the like. I/O device 308 can be utilized to provide output to and receive input from a user.

Computing platform 300 may comprise a storage device 312. Storage device 312 may be a hard disk drive, a Flash disk, a Random Access Memory (RAM), a memory chip, or the like. In some exemplary embodiments, storage device 312 can retain program code operative to cause processor 304 to perform acts associated with any of the subcomponents of computing platform 300.

Storage device 312 can store the modules detailed below. The modules may be arranged as one or more executable files, dynamic libraries, static libraries, methods, functions, services, or the like, programmed in any programming language and under any computing environment.

Storage device 312 may store a programming development environment 316, also referred to as IDE designed for programming, compiling if required, executing and debugging program code. One or more of the modules below may be implemented as one or more components such as plug-ins for IDE 316, enabling a user to receive a call graph of the code. Alternatively, one or more modules may be implemented as a separate executable which may be invoked by the user, or in any other manner and frequency.

Storage device 312 may store user interface 320 for displaying to a user or receiving from the user various aspects associated with the disclosure, such as a displaying a visual representation of the graph, displaying a tabular representation of the graph, displaying a table similar to Table 1, or the like.

Storage device 312 can store data and control flow management module 324, for managing the control and data flow of the apparatus, such that modules are invoked at the correct order and with the required information. For example, data and control flow management module 324 can be configured to call constraint system generation module 336 after code abstraction module 332 has finished, and provide the constraint system to constraint system solving module 340.

Storage device 312 can store code obtaining module 328 for obtaining computer code from a user. The code may be received in any manner, such as read from one or more files, retrieved through a communication channel, or the like. Code obtaining module 328 can also be part of IDE 316 and thus have access to the code.

Storage device 312 can store code abstraction module 332, for abstracting the code by eliminating flow related instructions and if required adding substitute instructions, as described in association with steps 108, 112 and 116 above.

Storage device 312 can store constraint system generation module 336 for generating and updating the constraint system as described in association with steps 120, 124, and 128 of FIG. 1 above.

Storage device 312 can store constraint system solving module 340 for solving the constraint system as described in association with step 132 of FIG. 1 above.

Storage device 312 can store call graph handling module 344, for providing functionality related to call graphs. In a non-limiting example, call graph handling module 340 can implement functions for creating a call graph from code, updating the call graph with additional edges discovered by calls to new functions, providing a visual representation of the graph, or the like, as detailed in association with steps 104 and 136 of FIG. 1 above. Functions of call graph handling module 340 may be called from user interface 320, from data and control flow management module 324, or other modules, which may or may not be associated with the system. Call graph handling module 340 may also be an external module, such as a third party module.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
obtaining computer code;
abstracting by a processor the computer code to obtain abstracted computer code comprising a plurality of instructions;
generating by the processor a constraint system, comprising at least one constraint on an at least one entity of the abstracted computer code;
obtaining by the processor a solution to the constraint system, the solution comprising at least one possible type for the at least one entity; and
creating by the processor a call graph based on the at least one type of the at least one entity; and
displaying the call graph over a display device.

2. The method of claim 1, wherein the constraint system is generated upon at least one instruction from the plurality of instructions, each of the at least one instruction selected from the group consisting of: an assignment and a method invocation.

3. The method of claim 1, wherein said abstracting comprising eliminating from the computer code at least one flow-related instruction.

4. The method of claim 3, wherein said abstracting the computer code comprises entering at least one second instruction replacing the at least one flow-related instruction.

5. The method of claim 3, wherein the flow-related instruction is selected in accordance with a programming language of the computer code.

6. The method of claim 1, wherein obtaining the solution comprises using a technique selected from the group consisting of: abstract interpretation and chaotic iteration.

7. The method of claim 1, wherein the entity is a variable or a parameter.

8. The method of claim 1, wherein the at least one possible type of the at least one entity comprises at least two possible types for the at least one entity.

9. The method of claim 1, wherein said generating the constraint system and said obtaining the solution to the constraint system are repeated until no changes are detected.

10. A computerized apparatus having a processor, the processor being configured to perform the steps of:
obtaining computer code;
abstracting by the processor the computer code to obtain abstracted computer code comprising a plurality of instructions;
generating by the processor a constraint system, comprising at least one constraint on an at least one entity of the abstracted computer code;
obtaining by the processor a solution to the constraint system, the solution comprising at least one possible type for the at least one entity;
creating by the processor a call graph based on the at least one type of the at least one entity; and
displaying the call graph over a display device.

11. The apparatus of claim 10, wherein the constraint system is generated upon at least one instruction from the plurality of instructions, each of the at least one instruction selected from the group consisting of: an assignment and a method invocation.

12. The apparatus of claim 10, wherein said abstracting comprising eliminating from the computer code at least one flow-related instruction.

13. The apparatus of claim 12, wherein said abstracting the computer code comprises entering at least one second instruction replacing the at least one flow-related instruction.

14. The apparatus of claim 12, wherein the flow-related instruction is selected in accordance with a programming language of the computer code.

15. The apparatus of claim 10, wherein obtaining the solution comprises using a technique selected from the group consisting of: abstract interpretation and chaotic iteration.

16. The apparatus of claim 10, wherein the entity is a variable or a parameter.

17. The apparatus of claim 10, wherein the at least one possible type of the at least one entity comprises at least two possible types for the at least one entity.

18. The apparatus of claim 10, wherein said generating the constraint system and said obtaining the solution to the constraint system are repeated until no changes are detected.

19. A computer program product comprising a computer readable storage medium retaining program instructions, which program instructions when read by a processor, cause the processor to perform a method comprising:
obtaining computer code;
abstracting by the processor the computer code to obtain abstracted computer code comprising a plurality of instructions;
generating by the processor a constraint system, comprising at least one constraint on an at least one entity of the abstracted computer code;
obtaining by the processor a solution to the constraint system, the solution comprising at least one possible type for the at least one entity;
creating a call graph based on the at least one type of the at least one entity; and
displaying the call graph over a display device.

20. The method of claim 1, further comprising performing, based on the call graph, at least one action selected form the group consisting of: compiler optimization, compile-time error detection, dead code detection and program coverage determination.

21. The apparatus of claim 10, wherein said processor is further configured to perform at least one action selected from the group consisting of: compiler optimization, compile-time error detection, dead code detection and program coverage determination.

22. The method of claim 1, wherein the method generates a static call graph.

* * * * *